United States Patent [19]

Ashdown

[11] 4,338,960
[45] Jul. 13, 1982

[54] GUILLOTINE TYPE DAMPER

[75] Inventor: Ronald A. Ashdown, Redhill, England

[73] Assignee: Foster Wheeler Energy Corporation, Livingston, N.J.

[21] Appl. No.: 175,562

[22] Filed: Aug. 5, 1980

[51] Int. Cl.³ .............................................. F16K 3/36
[52] U.S. Cl. .................................. 137/240; 251/159; 251/174
[58] Field of Search ................. 251/159, 174; 137/240

[56] References Cited

U.S. PATENT DOCUMENTS

| 1,998,081 | 4/1935 | Gerlich | 251/159 X |
| 2,156,967 | 5/1939 | Brosios | 251/159 X |
| 2,702,178 | 2/1955 | Scholl | 251/159 X |
| 3,047,024 | 7/1962 | Schuller | 251/159 X |
| 3,547,140 | 12/1970 | Hastings | 251/159 X |
| 3,741,522 | 6/1973 | Frolich | 251/170 X |
| 4,163,458 | 8/1979 | Bachmann | 251/159 X |
| 4,278,236 | 7/1981 | Janich | 251/159 |

FOREIGN PATENT DOCUMENTS 2719164 11/1978 Fed. Rep. of Germany ...... 251/159

*Primary Examiner*—Harold W. Weakley
*Attorney, Agent, or Firm*—Marvin A. Naigur; John E. Wilson

[57] ABSTRACT

The invention relates to guillotine dampers, particularly to those which are used to isolate a section of ductwork without the entire system requiring to be made inoperative. Known dampers of this kind suffer from the disadvantage that a satisfactory seal is difficult to establish around the periphery of the damper blade with the result that it can be hazardous in the isolated section if the remainder of the ductwork system is carrying toxic or otherwise dangerous fluids. According to the present invention, an auxiliary seal is provided in the form of first and second sealing surfaces extending around the periphery of the plane of movement of the blade, which are urged towards each other and into sealing engagement with the blade when in its closed position by means of a frame. The frame is continuously urged to the sealing position by means of devices. Cams act on the frame and are rotatable to selectively overcome the bias of the devices and withdraw the frame to release the damper blade for opening.

5 Claims, 4 Drawing Figures

GUILLOTINE TYPE DAMPER

BACKGROUND OF THE INVENTION

This invention relates to guillotine dampers and more particularly to the provision of an auxiliary system for providing a gas-tight barrier in flue ductwork. Such a gas-tight barrier is desirable to enable a section of ductwork to be isolated for maintenance purposes without the necessity of a complete shutdown.

Various devices have been disclosed for closing ducts in a fluid type manner. Typical of such devices are gate valve constructions in which a blade is movable to a closed position at which it traverses the duct and is sealed against the duct wall. Devices of this general type are disclosed in British Patent specification Nos: 331,261; 952,265; 1,503,126; and 1,529,234.

The prior art discloses the use of a secondary sealing system in gate valves or guillotine dampers in which a secondary seal is effected after the blade has reached its closed position traversing the duct. British Specification No: 1,529,234 shows such a system, but this has the disadvantage that its operation relies on some flexibility in the wall of the duct when the system is de-actuated to permit movement of the blade. Further, the operating mechanism shown in this prior specification is an integral part of the damper assembly.

SUMMARY OF THE INVENTION

It is an aim of the present invention to design a guillotine damper having a secondary sealing system which includes a minimum of moving parts and in which the operating mechanism therefor is not required to be a permanent component of the installation on a duct.

According to the present invention, there is provided a guillotine damper comprising a damper blade movable across a duct to close same; first and second sealing surfaces extending around the periphery of the duct respectively on either side of the plane of movement of the blade; and a frame extending contiguously with the first sealing surface, the frame being selectively movable to urge the first sealing surface against the blade in the closed position and the blade in turn against the second sealing surface to form a continuous seal around the common periphery of the closed duct and blade. A primary resilient seal will normally also be included which engages the periphery of the blade as it moves into the closed position.

In preferred embodiments, the damper will include a plenum chamber surrounding the first and second sealing surfaces, and means for delivering air under pressure thereto.

To ensure the creation of a uniform seal, the frame is preferably normally biased toward the blade, means being provided for selectively withdrawing same therefrom.

In all embodiments of the invention it is normal to include means for selectively moving the frame but such means need not be a permanent component, and can be detachable for use elsewhere. Typically, a cam mechanism is employed which is preferably operated by a fluidic system. A removable manual lever may also be provided in the event of failure of the operating system.

BRIEF DESCRIPTION OF THE DRAWINGS

The invention will now be described by way of example and with reference to the accompanying drawings wherein.

DESCRIPTION OF THE PREFERRED EMBODIMENT

Figure 1:
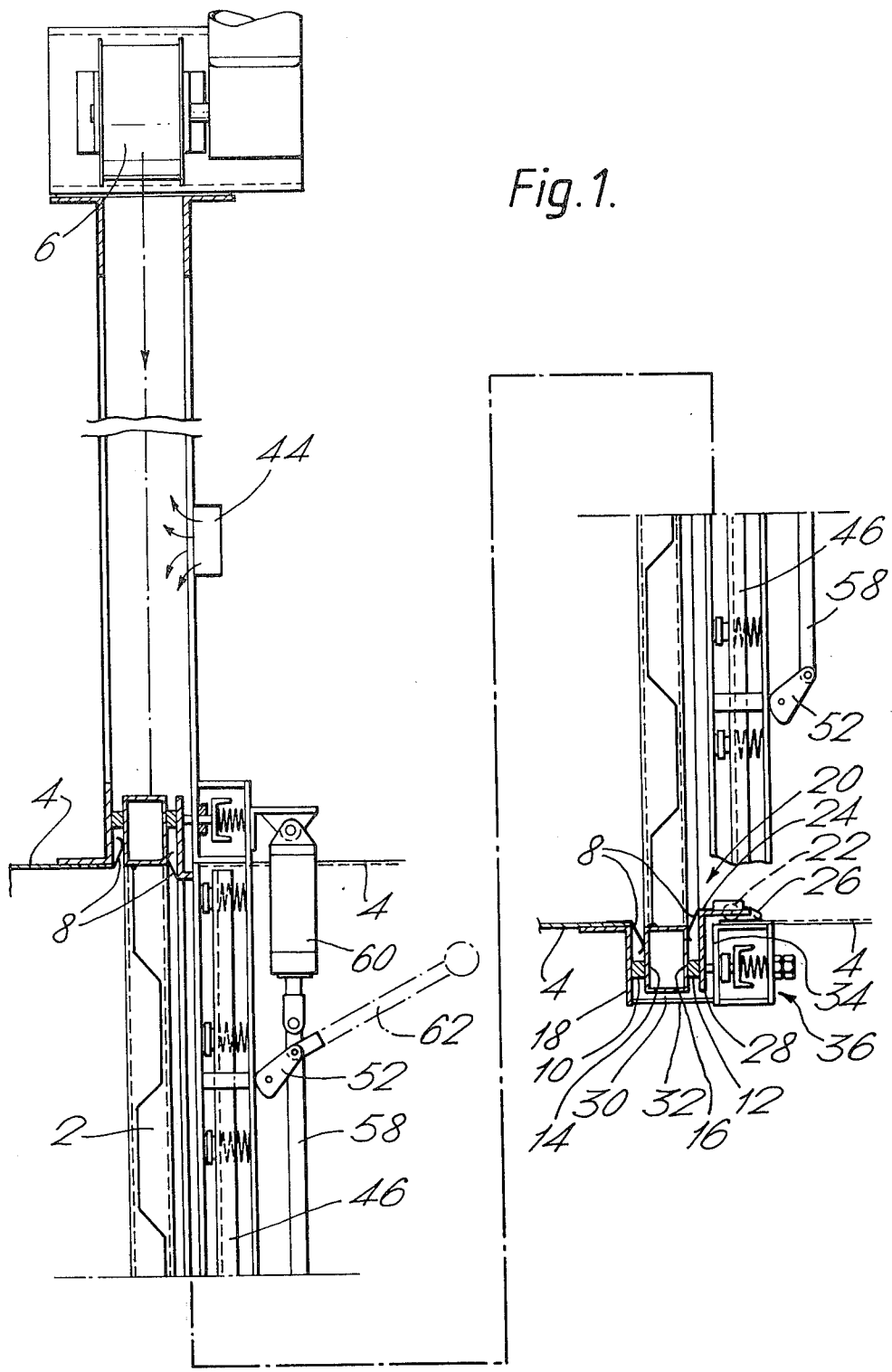
FIG. 1 is a partly broken sectional elevation of a guillotine damper according to the invention.

The damper of FIG. 1 comprises a blade 2 movable across a duct 4. The damper is normally oriented for vertical movement imparted by a driver 6 through cables and pulleys (not shown). Suitable counterweights (also not shown) can be provided if necessary.

The blade 2 is shown in the closed position at which two sealing systems are operating. The first system comprises resilient spring seals 8 which are engaged by the periphery of the blade 2 as it moves towards the position shown. The second comprises seals 10 and 12 which present first (14) and second (16) sealing surfaces also shown in engagement with the periphery of the blade 2. Seal 10 is mounted on a flange 18 fixed to the wall of the duct 4 and seal 12 is mounted on the fin 28 on a frame 20 which is movable on rollers 22 towards and away from the flange 18 to clamp the blade 2 between the sealing surfaces 14 and 16 as shown.

The frame 20 extends around the periphery of the duct 4 and has an axial portion 24 carrying the rollers 22 and a resilient seal 26, and an outwardly extending fin 28 carrying the seal 12 which extends into a plenum chamber 30 defined by the flange 18, outer wall 32 and opposing flange 34 also fixed to the duct wall. Each device 36 (described below) for biasing the frame 20 towards the blade 2 forms a seal across flange 34 and hence the plenum chamber 30 is sealed with the blade and frame in the position shown. To provide a further safeguard against leakage from the lefthand side of the duct as shown, air may be fed through an inlet 44 to the plenum chamber 30 at a pressure which is preferably equal to or greater than that of gases in the duct. The resilient seal 26 will offer the least resistance and therefore the air pressure can be monitored in response to the extent of air leakage past this seal 26.

Figure 2:
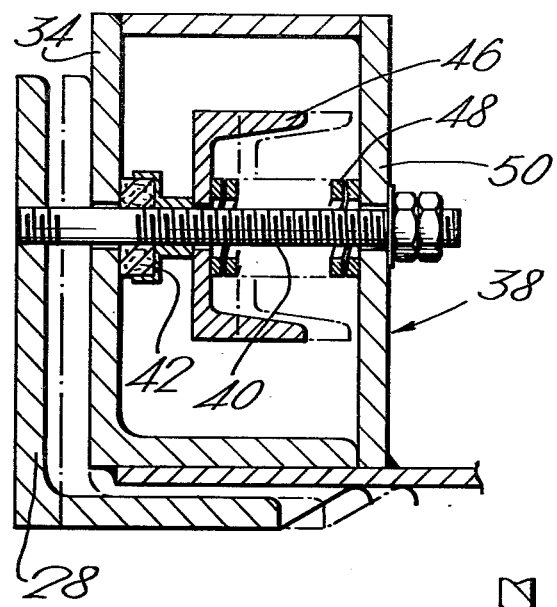
FIG. 2 is an enlarged sectional view of the spring biasing device used in the damper of FIG. 1.

Movement of the frame 20 is controlled by a plurality of devices 36 which continually bias the frame 20 towards the blade 2 and a cam mechanism which can overcome the biasing force to withdraw it. A device 36 is shown more clearly in FIG. 2. It comprises a housing 38 secured to the duct wall through which extends a shaft 40 attached to the fin 28. The interior of the housing 38 is sealed from the fin 28 by a stuffing box 42 in the juxtaposed side 34. The shaft 40 carries a support channel 46 from which extends a compression spring 48 to side 50. External of the housing 38, the shaft 40 can be coupled to the cam mechanism described below. The springs 48 in each device 36 thus continually bias the frame 20 towards the blade 2, resilient seal 26 sliding against the duct wall during any movement.

Figure 3:
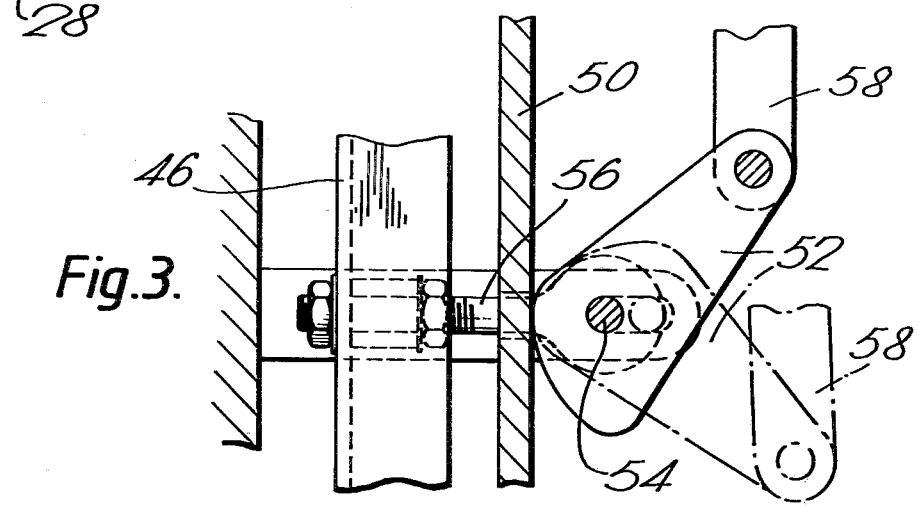
FIGS. 3 and 4 are enlarged detail sectional views of the cam mechanism used in the damper of FIG. 1.
Figure 4:
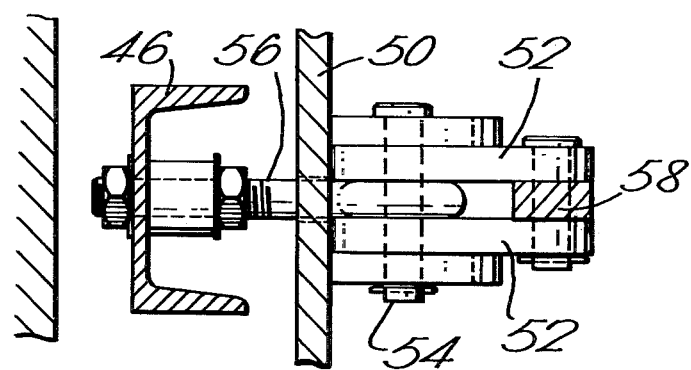

The housing 38 extends around the entire periphery of the duct 4, the side 50 providing a surface against which the cam mechanism can operate. The mechanism is shown in detail in FIGS. 3 and 4. It comprises a plurality of rotatable cams 52, each mounted on a pivot 54 secured to a coupling 56 which extends through an opening in the side 50 to the support channel 46. Rotation of each cam 52 to the position shown in dotted outline in FIG. 3 thus withdraws the frame 20 from the blade 2. It will be appreciated that the coupling 56 may also constitute the shaft 40 (FIG. 2) whereby actuation of the cam mechanism is directly coupled to compression of the springs 48.

The cams can be distributed evenly around the frame 20 but for convenience on a duct of rectangular cross-section they are located only on opposite (normally the vertical) sides of the duct: FIG. 1 shows the location of two cams 52 on one vertical side, their actuation being linked by a bar 58. The bar is in turn coupled to a piston/cylinder mechanism 60. With a similar mechanism on the opposite side movement of the frame 20 may be controlled by the selective delivery of pressurised gas (normally air) or liquid to the cylinders 60. A removable manual release lever 62 may also be provided if desired.

I claim:

1. A guillotine damper in combination with a duct comprising a duct, said duct being rectangular in cross section, a first flange extending perpendicular to and outward from said duct, an outer wall extending perpendicular to said flange and parallel to said duct, a second flange perpendicular to said outer wall and parallel to said first defined flange and defining with said first flange and said outer wall a plenum impervious to the ambient medium and open to said duct, a frame, said frame having an outwardly projecting fin extending into said plenum and parallel with said first and second flanges, an integral axial portion perpendicular to said fin and positioned within said duct, a roller mounted on said axial portion and bearing on the inside of said duct, a resilient seal between said axial portion and said duct for preventing the flow of fluid between said duct and said axial portion into said plenum, a damper blade movable across said duct to close same, first and second sealing surfaces extending within said plenum, said first sealing surface being mounted on said first flange and said second sealing surface being mounted on said second flange, means to urge said frame toward said first flange so that said fin compresses said second sealing surface against said blade and said blade compresses said first sealing surface so that the portion of the duct on one side of the blade is completely sealed from the portion of the duct on the other side of the blade.

2. The combination defined in claim 1 further comprising a primary sealing means including a resilient seal on said first flange and a resilient seal on said second flange spaced inward of said first and second sealing surfaces and which engage the periphery of said blade as it moves into said plenum.

3. The combination defined in claim 2 wherein said means for urging said first sealing surface comprises a spring-biased shaft extending through said second flange and engaging against said frame.

4. The combination defined in claim 3 wherein there are a plurality of said spring-biased shafts and further comprising a cam rotatably mounted on each shaft and rotatable to move said shaft axially into engagement with said fin, each of said cams being mechanically connected to move said shafts in unison.

5. The combination defined in claim 4 further comprising an inlet in said plenum through which air may be fed at a pressure at least as great as the pressure within said duct to further safeguard against leakage into said plenum.

* * * * *